United States Patent

[11] 3,549,182

| [72] | Inventors | Robert O. Bogue;<br>Arthur Glenton, South Bend, Ind. |
|---|---|---|
| [21] | Appl. No. | 851,418 |
| [22] | Filed | Aug. 19, 1969 |
| [45] | Patented | Dec. 22, 1970 |
| [73] | Assignee | The Bendix Corporation<br>a corporation of Delaware |

[54] GAGE FASTENING DEVICE
1 Claim, 3 Drawing Figs.

[52] U.S. Cl. .................................................. 287/52.08,
   33/169
[51] Int. Cl. ...................................................... F16d 1/06
[50] Field of Search .......................................... 287/52.05,
   53TK, 52.08, 119; 85/8.3, 8.1; 279/97; 33/178B,
   169B

[56] References Cited
UNITED STATES PATENTS

| 1,186,075 | 6/1916 | Bryant | 33/178B |
| 2,444,922 | 7/1948 | Deetman | 287/52.05 |
| 2,471,961 | 5/1949 | Jones | 33/178B |
| 2,808,996 | 10/1957 | Delfox | 85/8.3X |
| 3,152,654 | 10/1964 | Conover | 279/97X |
| 3,298,723 | 1/1967 | Damm | 287/119 |
| 2,807,882 | 10/1957 | Lovenston | 33/169B |

FOREIGN PATENTS

| 355,897 | 9/1905 | France | 287/52.08 |
| 1,130,596 | 10/1956 | France | 287/119 |

*Primary Examiner* — David J. Williamowsky
*Assistant Examiner* — Andrew V. Kundrat
*Attorneys* — C. F. Arens and Plante, Arens, Hartz, Hix and Smith ABSTRACT: A gage fastening device having a body with an axial bore therein and a transverse slot intersecting said axial bore. A retainer means frictionally disposed in said transverse slot and projecting into said axial bore. A shaft means having thereon a transverse slot is slidably disposed in said axial bore with said transverse slot providing for axial engagement with said retaining means thereby providing for a predetermined axial movement of said shaft means with respect to said body.

PATENTED DEC 22 1970
3,549,182
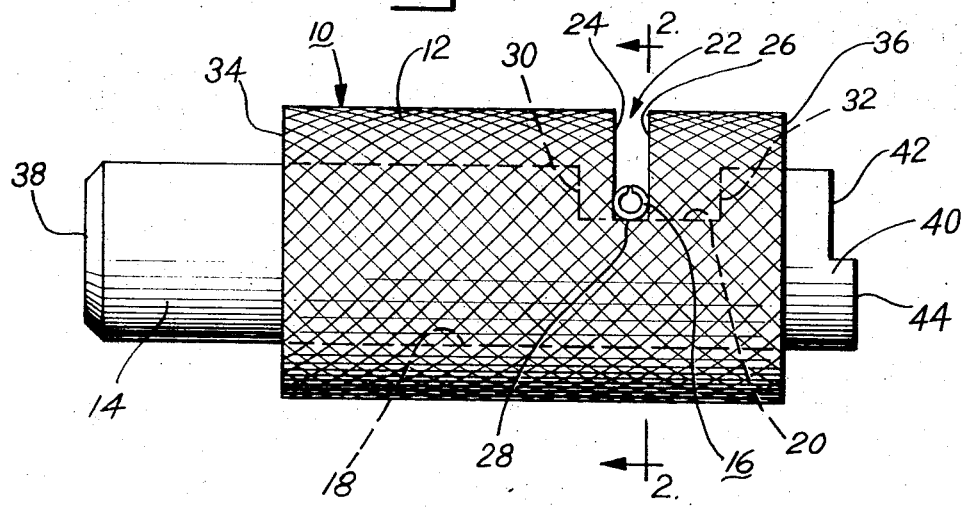
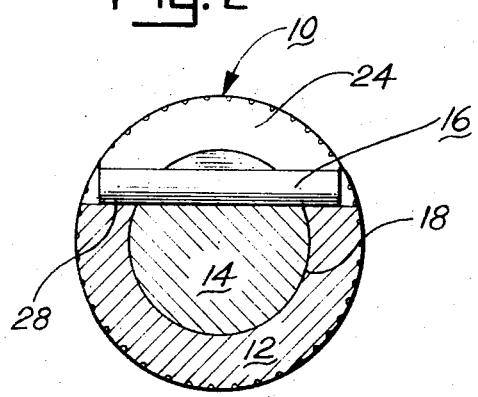
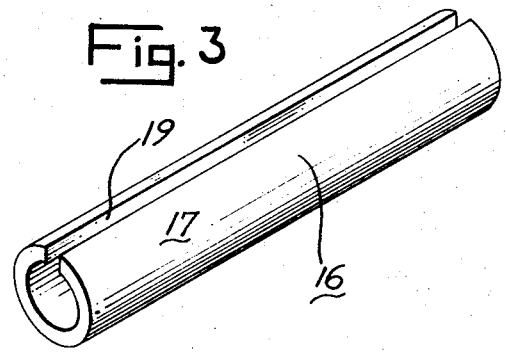
INVENTORS
ROBERT O. BOGUE &
BY ARTHUR GLENTON
Plante, Arens, Hartz, Hill and Smith
ATTORNEYS

GAGE FASTENING DEVICE

BACKGROUND OF THE INVENTION

The invention concerns an improvement to fastening techniques used in association with conventional barrel type bobber gages. However, it is felt that the invention may be used for any application where it is desirable to limit or contain the axial movement of a shaft with respect to another member.

The conventional barrel type bobber gages in wide use throughout industry and with which I am familiar consist mainly of bulky, large diameter body or sleeve means slidably retaining therein a shaft means having a slot thereon for cooperation with a set screw mounted in said body means to provide for limited axial movement of the shaft means. These conventional bobber gages employ fixed walls to provide sufficient material with which to retain the set screw. The wall thickness of the bobber gage precludes its use in close quarters where sufficient area is unavailable on which to place the end of the body member which is the reference surface against which height and depth measurements are made. Moreover, if sufficient material is left on the body in the area of the set screw and the remainder of the body is machined away to allow its use in close quarters, the cost of the bobber gage becomes prohibitively expensive.

SUMMARY OF THE INVENTION

It is the purpose of this invention to provide a barrel type bobber gage whose body or barrel is sufficiently small enough to allow its use where space is not available to use the conventional devices.

It is another object of this invention to provide a retaining or fastening technique that will satisfactorily cooperate with a reduced diameter body or barrel means.

It is still another object of this invention to effect a substantial cost savings in association with the manufacturing of said barrel type bobber gages.

Other objects and features of the invention will be apparent from the following description of the gage fastening device taken in connection with the accompanying drawings.

BRIEF DESCRIPTION OF THE DRAWINGS

FIG. 1 is a side view of a barrel type bobber gage embodying the fastening concept of this invention;

FIG. 2 is a sectional view taken along line 2-2 of FIG. 1; and

FIG. 3 is an enlarged perspective view of the retaining means shown in FIG. 1.

DESCRIPTION OF THE INVENTION

Referring now to the drawings and particularly to FIG. 1, illustrating the preferred form of this invention, a barrel type bobber gage is generally indicated by reference numeral 10 and is comprised of a body or barrel 12, a shaft means 14 and a hollow retaining means 16.

The body 12 has a bore 18 for slidably receiving said shaft means 14. The shaft means 14 has thereon a transverse axially extending slot 20. The body or barrel 12 has a transverse slot 22 for receiving the hollow retaining means 16. The hollow retaining means 16 is comprised of a cylindrical portion 17 having an axial slot 19, as may be seen best in FIG. 3. The axial slot 19, formed in cylindrical portion 17, gives the retaining means 16 sufficient lateral resiliency to allow the retaining means to be frictionally disposed in the transverse slot 22 so as to firmly frictionally engage slot walls 24 and 26. The retaining means 16 abuts slot bottom 28, the depth of which is predetermined with respect to the transverse slot 20, to facilitate free sliding action between the retaining means 16 and the transverse slot 20. It may also be seen from the drawings that the shaft means 14 is axially free to slide relative to the retaining means 16 until either slot end 30 or 32 of the slot 20 engages the retaining means 16.

With reference now to the manner of operation of the structure shown in FIG. 1, the body or barrel 12 has ends 34 and 36 which are finished surfaces in a radial plane. Shaft means 14 has shaft ends 38 and 40. Shaft end 38 is a finished surface in a radial plane for cooperation with end 34 of body 12 for measuring the depth of one surface relative to another. Shaft end 40 has parallel surfaces 42 and 44 which represent respectively the minimum and maximum tolerances of acceptability of the gage. Thus, for the gage to indicate acceptability of any given measurement, body end 36 must be even with or between parallel surfaces 42 and 44. Additional descriptive matter regarding specific operation of the gage 10 may be found in copending U.S. Application Ser. No. 752,859, and now Pat. No. 3,503,133 having in common with this application the same assignee.

It is specifically emphasized that the subject matter disclosed in this application is particularly valuable to the art, since it has been found that the gage shown can be manufactured at a cost of approximately 40 percent less than other gages of the same type now available.

While the specific details have been herein shown and described, the invention is not confined thereto, as other substitutes can be made within the spirit and scope of the invention.

We claim:

1. A gage fastening device comprising:
   a body having an axial bore therein;
   said body having a transverse slot which between its ends passes through an arcuate sector of said body and said axial bore; and
   hollow retaining means frictionally disposed in said transverse slot, said hollow retaining means having a cylindrical portion with an axial slot therein, said axial slot being aligned in the plane of the transverse slot of said body; and shaft means slidably disposed in said axial bore having a first end and a second end, said shaft means having an elongated transverse slot whose axial length along the shaft is greater than that of said transverse slot, said elongated transverse slot being adjacent said transverse slot of said body and said transverse slot of said body resiliently seating said hollow retaining means between its walls and holding it in frictional engagement with the bottom of said elongated transverse slot for permitting limited axial sliding movement of said shaft means with respect to said body while said second end has parallel surfaces for measuring said axial sliding movement as the distance between said first end and said body.